J. D. PEDERSEN.

CARTRIDGE STOP FOR MAGAZINE FIREARMS.

APPLICATION FILED JULY 19, 1911.

Reissued Nov. 21, 1911.

13,321.

2 SHEETS—SHEET 1.

Witnesses:
Wm Bohleber
M. Lauron Dyer.

Inventor
JOHN D. PEDERSEN
By his Attorneys
Kerr Page & Cooper & Hayward

COLUMBIA PLANOGRAPH CO., WASHINGTON, D. C.

J. D. PEDERSEN.

CARTRIDGE STOP FOR MAGAZINE FIREARMS.

APPLICATION FILED JULY 19, 1911.

Reissued Nov. 21, 1911.

13,321.

2 SHEETS—SHEET 2.

Witnesses:
Wm. Bohleber
M. Lawson Dyer.

Inventor
JOHN D. PEDERSEN
By his Attorneys
Kerr Page Cooper & Hayward

COLUMBIA PLANOGRAPH CO., WASHINGTON, D. C.

UNITED STATES PATENT OFFICE.

JOHN D. PEDERSEN, OF JACKSON, WYOMING.

CARTRIDGE-STOP FOR MAGAZINE-FIREARMS.

13,321. Specification of Reissued Letters Patent. Reissued Nov. 21, 1911.

Original No. 953,797, dated April 5, 1910, Serial No. 483,358. Application for reissue filed July 19, 1911. Serial No. 639,445.

*To all whom it may concern:*

Be it known that I, JOHN D. PEDERSEN, of Jackson, in the county of Uinta and State of Wyoming, have invented certain new and useful Improvements in Cartridge-Stops for Magazine-Firearms; and I hereby declare that the following is a full, clear, and exact description thereof, which will enable others skilled in the art to which it appertains to make and use the same, reference being had to the accompanying drawings, and to the characters of reference marked thereon, which form part of this specification.

The object of my present invention is to provide a cartridge stop for the magazine of a fire arm, which is particularly adapted for use with fire arms having reciprocating magazine action-bars, and which, coöperating with the magazine at times prevents the escape of the cartridge from the magazine, and at others spaces and controls the removal of the cartridges from the magazine.

Figure 1:
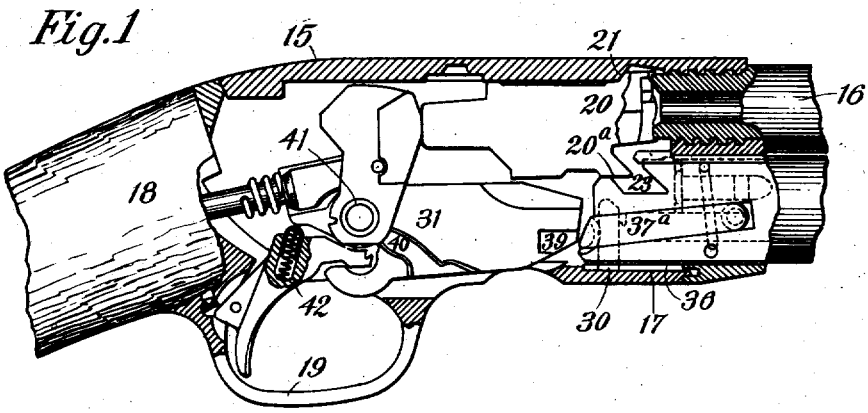
Figure 2:
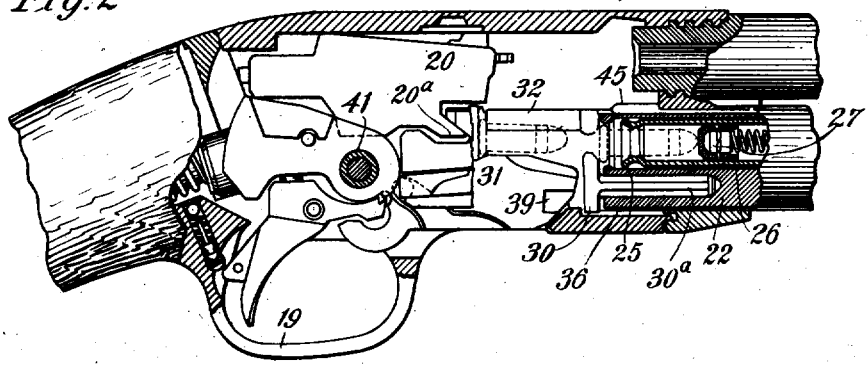
Figure 3:
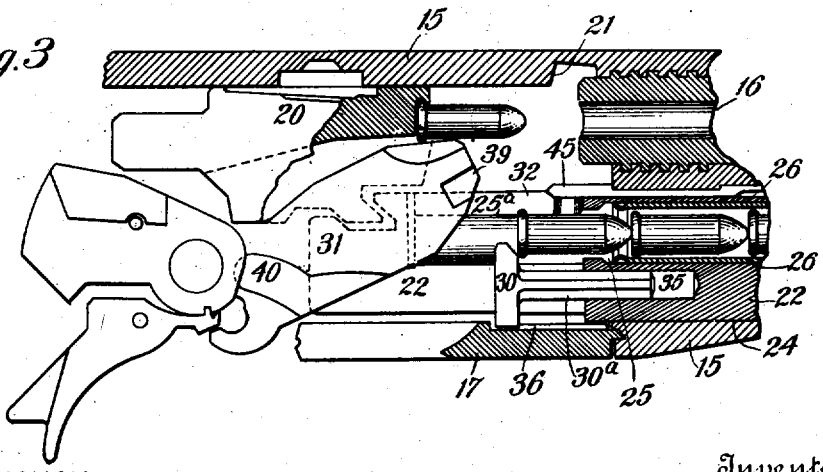
Figure 4:
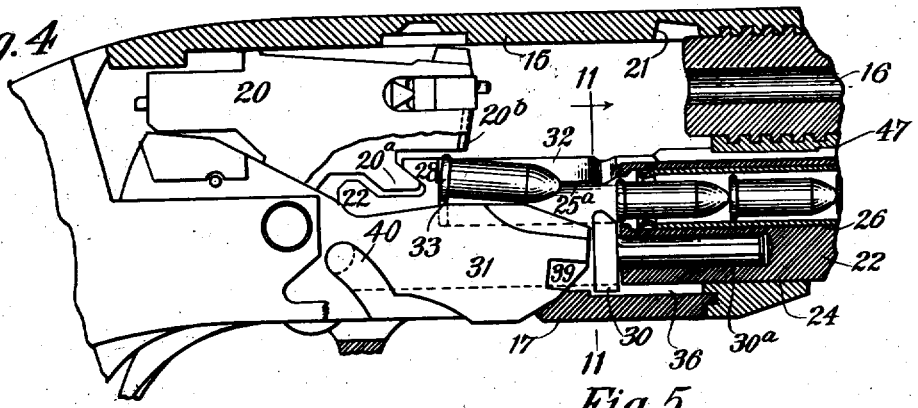
Figure 5:
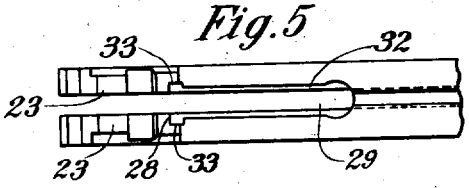
Figure 6:
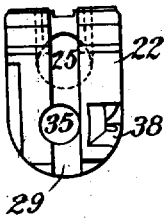
Figure 7:
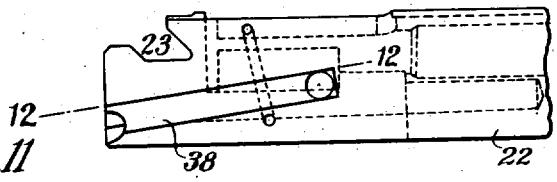
Figure 11:
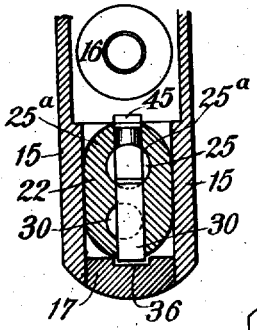
Figure 9:
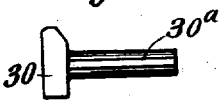
Figure 8:
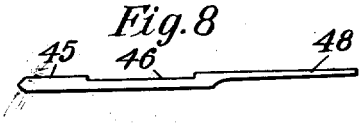
Figure 10:
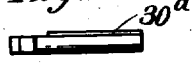
Figure 13:
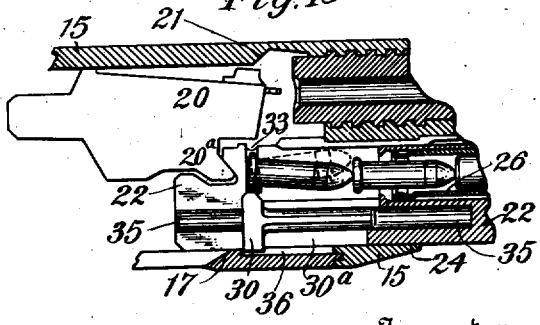
Figure 12:
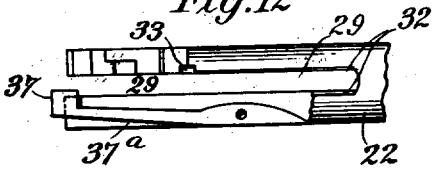

Figure 1 shows a vertical sectional view of the frame portion of a fire arm embodying my present improvements. Fig. 2 is a similar vertical sectional view of the frame, together with a sectional view of parts of the magazine with the breech bolt in open position and other parts of the magazine in corresponding position. Fig. 3 is a vertical sectional view on an enlarged scale from that of Figs. 1 and 2, showing portions of the frame and portions of the magazine partially in section and in one of its positions. Fig. 4 is a similar view to Fig. 3, showing the movable parts of the fire arm in still another position. Fig. 5 is a top or plan view of the rear end of the magazine action bar. Fig. 6 is a rear end view on an enlarged scale of the same. Fig. 7 is a side elevation of the same on the same scale as shown in Fig. 5. Fig. 8 is a detail of a cartridge holding retainer employed in the construction. Figs. 9 and 10 are detail side and top views of the cartridge stop. Fig. 11 is a section on line 11—11 of Fig. 4. Fig. 12 is a partial section on line 12 of Fig. 7. Fig. 13 is a vertical sectional view of the character shown by Figs. 3 and 4, showing the magazine in still another position.

Referring to the reference letters and figures in a more particular description, 15 indicates the main portion of the frame having the barrel 16 secured to the forward end. The other portion 17 of the frame, usually known as a trigger plate, is preferably detachable from the part 15 and has secured to its rear end the butt stock 18 and carries the trigger guard 19. The breech block 20 is arranged to reciprocate longitudinally in a suitable chamber in the frame, as well as to have a rising and falling movement at its forward end when in closed or closing position to engage and disengage the breech-up shoulders at 21. For operating the breech block 20 it is provided with a pair of inclined tooth-like projections $20^a$, adapted to engage with the rear end of the magazine action bar 22, and particularly with the angular notch 23 in the rear end of the action bar. The action bar 22 passes through an opening at 24 in the forward end of the frame and is adapted to reciprocate forwardly and backwardly in said opening, which serves as a bearing or support for the rear end of the action bar. The forward portion of the action bar which lies under the barrel may be provided with a sliding handle secured thereto in the usual manner. The action bar is provided longitudinally with a tubular magazine 25, which preferably receives an inner tube 26 and a spring actuated follower 27. The rear end of the magazine terminates at the shoulder 28, and the rear end of the action bar, including the magazine tube, is vertically slotted as indicated at 29, said slot receiving in part the cartridge stop 30 and in part providing a space in which the cartridge carrier 31 is adapted to operate. At the rear end of the tubular magazine, the top of the action bar is cut away to afford a cartridge outlet opening 32 transverse to the length of said action bar. The general width of this opening is such as only to freely allow the passage of the body of the cartridge out of the magazine, and at the rear end the width is enlarged as indicated at 33 to afford a passage for the head of the cartridge. This enlargement 33 affords a shoulder at the forward side adapted to engage with the rim of the cartridge and prevent longitudinal movement of the cartridge when the head or rim is introduced more or less into the outlet opening. Necessarily the diameter of the tubular magazine is large enough to receive the head of the cartridge with its flange or rim and permit its free longitudinal movement, while the main portion of the outlet opening 32 is somewhat narrower than the full diameter of the magazine at the outlet opening, which results in providing the rounded shoulders 25ᵃ adapted to engage the head or rim of the cartridge and prevent the displacement of the cartridge out of the magazine until the head or rim registers with the enlarged portion 33 of the outlet opening. In order to support the cartridge stop 30, it is provided with a cylindrical stem 30ᵃ fitting and sliding freely in a longitudinal opening 35 in the rear end of the magazine action bar. As before suggested, the cartridge stop 30 is received in and reciprocates longitudinally in the slot 29 in the rear end of the action bar and the upper end of the stop, which is inclined or beveled as shown, stands partially in the tubular magazine opening.

The lower end of the cartridge stop 30 is received in a longitudinal slot 36 in the trigger plate and the movement of the stop in connection with the action bar as it moves rearwardly is limited by striking the shoulder at the rear end of this slot 36. The cartridge stop 30 has a reciprocating action with reference to the action bar from a position adjacent to the rear end of the action bar, as shown in Fig. 1, to a position at the forward end of the magazine outlet opening 32, as shown in Fig. 2. The cartridge stop 30 also has a limited amount of reciprocating motion with reference to the frame of the fire arm, the same being permitted by the slot 36 and limited in one direction as above suggested by the shoulder at the rear end of this slot. For operating the carrier 31, the action bar is provided with a cam projection 37 mounted on a spring arm 37ᵃ arranged in an inclined recess 38 in the rear end of the action bar, the said cam projection 37 being arranged to ride up an incline 39 in the forward end of the carrier 31 as the action bar is moved rearwardly, and slide over the side of the carrier and snap into the cam slot 40 in the rear part of the carrier. The carrier 31 is pivotally hinged on the tubular pivot 41. As the action bar moves forwardly, the cam projection 37, engaging in the cam slot 40, causes the forward end of the carrier to be thrown upwardly, and upon said cam projection becoming disengaged from the carrier, the latter is thrown down by gravity and the action of the combined trigger and carrier spring 42. The cam projection 37 in its normal position standing partially into or across the rear end of the slot 29 in the rear end of the action bar, is adapted also to engage with the cartridge stop 30 and move it forwardly when the action bar 37 is moved forwardly. This cam projection 37 also serves to prevent the accidental displacement of the cartridge stop from its position in the rear end of the action bar when the gun is taken down and particularly when the trigger plate, with the butt stock 18, is removed from the other parts.

The front end of the breech bolt 20 is provided with a vertical flanged groove, as indicated at 20ᵇ, to receive the flanged head of the cartridge, and the arrangement of parts is such that when the carrier 31 operates the groove 20ᵇ will register with the enlargement 33 of the outlet opening of the magazine.

The mechanism of the fire arm shown and described is substantially the same as that shown and described in my Patent No. 908,883 of January 5, 1909, and the description of the operation may well accordingly be restricted to that appertaining to the cartridge stop. In the construction herein shown, the magazine tube being loaded with cartridges in the usual manner, the same will lie in the rear portion of the magazine, end to end, as shown in Figs. 3, 4 and 13, with the magazine spring and follower pressing them toward the rear in the usual manner. When the action bar is moved rearwardly, the breech block is unlocked and carried rearwardly, of course, and the cartridge stop 30 is carried along with the action bar until it strikes the rear end of the slot 36. During this movement the head of the rear cartridge will be engaging against the shoulder 28 at the rear end of the magazine. When the cartridge stop 30 reaches its limit of rearward movement, the continuation of the movement of the magazine action bar brings the head of the rearmost cartridge into engagement with the inclined upper end of the cartridge stop, up which it proceeds to ride, nothing hindering, and the flange of the cartridge head passes partially into the enlarged portion 33 of the outlet opening, where it becomes locked from longitudinal movement with reference to the action bar. As the movement of the action bar is continued rearwardly the whole of the rearmost cartridge passes over the top of the cartridge stop 30 and is elevated or moved vertically partially into the outlet opening 32. The carrier 31 being located immediately to the rear of the cartridge stop, receives and supports the cartridge in its deflected position partially in the outlet opening. When the head of the second cartridge from the rear in the magazine engages the inclined upper end of the cartridge stop, it is unable to pass the same, for the reason that the width of the outlet opening 32 at this point is less than the diameter of the head of the cartridge, and the inclined shoulders 25ᵃ hold the cartridge down in engagement with the stop. The action bar is preferably allowed to move rearwardly some little distance after the second cartridge is held or stopped by the cartridge stop 30, whereby the last two cartridges are spaced. The arrangement further is such that as the movement of the action bar is reversed and it is moved forwardly, the carrier 31 will operate before the forward end of the rearmost cartridge will become engaged with the rear end of the second cartridge. This obviates any friction of the first cartridge on the second cartridge when the former is being removed from the magazine. When the carrier operates it moves the rearmost cartridge completely out of the outlet opening in the magazine and slides it up the front face of the breech bolt, where it is held preparatory to being introduced into the barrel. As the magazine action-bar is moved forwardly, the cartridge in the magazine which was stopped by the cartridge stop assumes the position in the rear end of the magazine at the outlet opening, and as the action bar completes its forward movement the cartridge stop is caught and moved slightly forward by the cam projection 37, at which time all parts assume their normal positions ready for a repetition of the operation.

In order to prevent cartridges being accidentally displaced through the outlet opening 32 when the breech block is closed and the action bar is in its forward position, which might perhaps occur if the arm were inverted from its normal position, there is provided a cartridge retainer 45 which is adapted to occupy a position over the said opening 32 of the magazine outlet opening when the parts are in closed position, or nearly so. The retainer has a recess 46 which engages over the frame or receiver 15 at the point 47 and is located between said point 47 and the magazine 25. The forward end 48 of the retainer engages with an extension of the receiver 15 (see Fig. 4) or it is apparent that when the receiver terminates at the forward end of the slot 46, as is usually the case, the extension 48 should contact with the under side of the barrel. A cartridge tending to become displaced through the outlet opening when the magazine action bar was in its forward position or nearly so, would obviously come in contact with this retainer and thereby be prevented from becoming displaced sufficiently to be objectionable. Upon referring to Fig. 13 the manner in which the cartridge is displaced in the outlet opening 32 will at once appear. As soon as the rim of the rearmost cartridge strikes the cartridge stop 30 to deflect said rim into the T-slot 33 there is a slight tendency, owing to friction between the cartridge stop and cartridge rim, for the bullet end of the cartridge to be deflected upwardly as indicated by the dotted lines in said Fig. 13. The tendency of the bullet end of the cartridge to rise upwardly is increased if for any reason the T-slot 33 is obstructed or partially obstructed as by the accumulation of grease therein. Owing to the fact that the magazine below the outlet opening is necessarily large enough to allow the head of the cartridge to pass freely therein it will at once be observed, that if the T-slot 33 be obstructed, the cartridge would be raised from the longitudinal position shown in Fig. 13 to a substantially vertical position if the retainer were not provided, which holds the cartridge substantially parallel to the action bar and causes the rim of the cartridge to enter the T-slot 33 without fail.

It is evident that modifications and changes in and from the construction herein described may be made without departing from my invention.

What I claim as new and desire to secure by Letters Patent is—

1. The combination in a fire arm of a reciprocating tubular magazine action bar having at the rear an outlet opening for cartridges transverse to the length of said bar, a cartridge stop with reference to which the magazine reciprocates arranged to deflect the cartridges into the outlet opening when the cartridge is passing the stop, substantially as set forth.

2. The combination in a fire arm of a reciprocating tubular magazine action bar having at the rear an outlet opening for cartridges transverse to the length of said bar, a cartridge stop with reference to which the magazine reciprocates arranged to deflect the rearmost cartridge in the magazine into the outlet opening when the same is passing the cartridge stop and to engage and stop the second cartridge in the magazine, substantially as set forth.

3. The combination in a fire arm of a reciprocating tubular magazine having an outlet for cartridges transverse to the length of said magazine, a cartridge stop with reference to which the magazine is reciprocated having an inclined face by means of which the cartridges are deflected into the outlet opening, and by which the cartridges are stopped when the outlet is out of position to permit them movement thereinto, substantially as set forth.

4. The combination of a tubular magazine having an outlet opening transverse to the length of said magazine, a cartridge stop in the rear of the magazine, and with reference to which the magazine reciprocates, and arranged to deflect the cartridges passing it into the outlet opening, and a cartridge carrier arranged to support the cartridge in its deflected position, substantially as set forth.

5. The combination of a tubular magazine having an outlet opening transverse to the length of said magazine, a cartridge stop in the rear of the magazine, and with reference to which the magazine reciprocates, and having an inclined face adapted to deflect a cartridge passing the cartridge stop into the outlet opening, and a cartridge carrier arranged to support the cartridge in the outlet opening and remove it therethrough substantially as set forth.

6. The combination of a tubular magazine having an outlet opening transverse to the length of said magazine, means for moving the cartridges rearwardly in the magazine to a position at the outlet opening, a cartridge stop in the rear of the magazine and with reference to which the magazine reciprocates, and arranged to deflect a cartridge partially into the outlet opening as the outlet opening passes the cartridge stop, and to catch and stop the second cartridge, and a cartridge carrier arranged to support the cartridge in the outlet opening and remove it therethrough, substantially as set forth.

7. The combination of a tubular magazine having an outlet opening transverse to the length of said magazine, means for feeding the cartridges rearwardly in the magazine to a point opposite the outlet opening, a cartridge stop partially in the rear of the magazine with reference to which the magazine reciprocates, and arranged to deflect the rearmost cartridge into the outlet opening and engage and stop the following cartridges and space them from the rear cartridge, and a carrier arranged to support and remove the rear cartridge from the outlet opening, substantially as set forth.

8. In a magazine fire-arm, the combination of a reciprocating magazine action bar provided with a slot therein to receive a cartridge, a breech block, a cartridge carrier for moving the cartridges from the slot to the breech block, and a retainer coöperating with said action bar and said cartridge carrier to properly feed the cartridges from the magazine to the breech-block.

9. In a magazine fire-arm, the combination of a reciprocating magazine action bar provided with a slot therein to receive a cartridge, a cartridge stop to deflect the cartridge into the outlet opening, and means for preventing an upward throw in said slot of the front end of the cartridge upon engagement of its rear end with said beveled face, substantially as and for the purposes described.

10. In a magazine fire-arm, the combination with a cartridge carrier and a magazine having a slot therein to receive a cartridge, of a cartridge stop carried by the action bar to deflect the cartridge in said slot and a cartridge retainer held in fixed position relative to the slot of the magazine to prevent upward throw of the front end of the cartridge, substantially as and for the purposes described.

11. In a fire-arm, a reciprocating magazine action bar having at its rear end an outlet opening for cartridges, a cartridge stop with reference to which the magazine reciprocates, in combination with a retainer comprising a portion projecting into the receiver and having a beveled nose, a recess on the upper portion thereof adapted to fit a shoulder on the receiver, and an extension of said retainer to hold the same in place.

12. In a magazine fire-arm, the combination of a reciprocating magazine action bar, having a cartridge opening and a T-slot in the rear end of said opening, said slot adapted to receive the rim of the cartridge, a cartridge stop adapted to move the rim of the cartridge into said T-slot, and a retainer covering the forward end of the cartridge opening and adapted to hold the cartridge substantially parallel to the action bar when the rim of the cartridge is entering the T-slot.

13. In a magazine fire-arm, a retainer comprising a part 45 projecting into the receiver 15, an extension 48, and an intermediate portion having the slot 46, said extension and slot adapted to be engaged to hold the said retainer in position.

In testimony whereof I affix my signature in the presence of two subscribing witnesses.

JOHN D. PEDERSEN.

Witnesses:

WM. BOHLEBER,
M. RAWSON DYER.

Copies of this patent may be obtained for five cents each, by addressing the "Commissioner of Patents, Washington, D. C."